(12) United States Patent
Ikefuji et al.

(10) Patent No.: US 11,754,704 B2
(45) Date of Patent: Sep. 12, 2023

(54) SYNTHETIC-APERTURE-RADAR IMAGE PROCESSING DEVICE AND IMAGE PROCESSING METHOD

(71) Applicant: NEC Corporation, Tokyo (JP)

(72) Inventors: Daisuke Ikefuji, Tokyo (JP); Taichi Tanaka, Tokyo (JP); Osamu Hoshuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 164 days.

(21) Appl. No.: 17/441,866

(22) PCT Filed: Mar. 29, 2019

(86) PCT No.: PCT/JP2019/014021
§ 371 (c)(1),
(2) Date: Sep. 22, 2021

(87) PCT Pub. No.: WO2020/202259
PCT Pub. Date: Oct. 8, 2020

(65) Prior Publication Data
US 2022/0179065 A1   Jun. 9, 2022

(51) Int. Cl.
G01S 13/90   (2006.01)

(52) U.S. Cl.
CPC ...... G01S 13/9023 (2013.01); G01S 13/9004 (2019.05)

(58) Field of Classification Search
CPC .. G01S 13/9023; G01S 13/9004; G01S 7/414; G01S 7/025; G01S 13/951;
(Continued)

(56) References Cited

U.S. PATENT DOCUMENTS

| 4,594,593 | A | * | 6/1986 | Nohmi | G09B 9/54 342/25 D |
| 4,723,124 | A | * | 2/1988 | Boles | G01S 13/9023 342/25 C |

(Continued)

FOREIGN PATENT DOCUMENTS

| EP | 2942638 A1 | * | 11/2015 | G01S 13/90 |
| GB | 2497003 A | * | 5/2013 | G01S 13/42 |

(Continued)

OTHER PUBLICATIONS

AlessandroFerrettietal,"PermanentscatterersinSARinterferomelry", IEEE1999InternationalGeoscienceand RernotaSensingSymposium. (GARSS'99, 1999,pp. 1528-1530val3. (Year: 1999).*

(Continued)

Primary Examiner — Nuzhat Pervin
(74) Attorney, Agent, or Firm — Sughrue Mion, PLLC

(57) ABSTRACT

The synthetic aperture radar image processing device includes time-series analysis unit which extracts persistent scatterers from time-series observation data for the observation direction for an observation area observed from multiple observation directions by a radar, and calculating displacement speeds of the extracted persistent scatterers, clustering unit which generates reflection point clusters by clustering extracted persistent scatterers based on their phase and position, distance calculation unit which calculates a distance between each of the persistent scatterers included in the reflection point clusters and each structure included in the observation area, representative value calculation unit which calculates each representative value for the distance between each persistent scatterer and each structure, for each reflection point cluster, and corresponding structure determination unit which associates the structure corresponding (Continued)

to the smallest representative value with the persistent scatterer, for each reflection point cluster.

15 Claims, 12 Drawing Sheets

(58) Field of Classification Search
CPC ...... G01S 13/87; G01S 13/5244; G01S 17/95; G01S 13/003; G01S 13/42; G01S 13/90; G01S 13/904; G01S 13/89; G06N 99/00; G09B 9/54
USPC ........................................................ 342/25 A
See application file for complete search history.

(56) References Cited

U.S. PATENT DOCUMENTS

| | | | | |
|---|---|---|---|---|
| 6,264,143 | B1 * | 7/2001 | Massonnet | G01S 13/003 342/354 |
| 6,512,996 | B1 * | 1/2003 | Praskovsky | G01S 17/95 702/189 |
| 6,583,751 | B1 * | 6/2003 | Ferretti | G01S 13/9023 342/25 R |
| 7,768,442 | B2 * | 8/2010 | Stickley | G01S 13/89 342/28 |
| 8,482,453 | B2 * | 7/2013 | Costantini | G01S 13/9023 342/25 R |
| 8,711,029 | B2 * | 4/2014 | Ferretti | G01S 13/904 342/25 C |
| 8,860,604 | B2 * | 10/2014 | Oswald | G01S 7/414 342/107 |
| 10,466,349 | B2 * | 11/2019 | Baskaran | G01S 13/723 |
| 10,585,171 | B2 * | 3/2020 | Oswald | G01S 13/87 |
| 2005/0237236 | A1 * | 10/2005 | Budic | G01S 13/5244 342/159 |
| 2010/0265122 | A1 * | 10/2010 | Oswald | G01S 13/42 342/136 |
| 2011/0163911 | A1 * | 7/2011 | Costantini | G01S 13/9023 342/25 C |
| 2011/0298655 | A1 * | 12/2011 | Leva | G01S 13/9023 342/25 C |
| 2012/0019410 | A1 * | 1/2012 | Ferretti | G01S 13/9023 342/25 C |
| 2013/0082858 | A1 * | 4/2013 | Chambers | G06N 99/00 342/22 |
| 2015/0323665 | A1 * | 11/2015 | Murata | G01S 7/411 342/25 A |
| 2015/0323666 | A1 * | 11/2015 | Murata | G01S 13/9023 342/25 C |
| 2016/0033639 | A1 * | 2/2016 | Jung | G01S 13/9023 342/25 C |
| 2017/0285158 | A1 * | 10/2017 | Halbert | G01S 7/414 |
| 2018/0106898 | A1 * | 4/2018 | Baskaran | G01S 7/4802 |
| 2020/0096628 | A1 * | 3/2020 | Tanaka | G01S 7/411 |
| 2020/0394780 | A1 * | 12/2020 | Sowter | G01S 13/9027 |
| 2021/0181336 | A1 * | 6/2021 | Tanaka | G01S 13/9023 |

FOREIGN PATENT DOCUMENTS

| | | | | |
|---|---|---|---|---|
| JP | 2012-014628 A | | 1/2012 | |
| JP | 2015215210 A | * | 12/2015 | ......... G01S 13/9023 |
| JP | 6349937 B2 | * | 7/2018 | ......... G01S 13/9023 |
| WO | WO-2008145993 A2 | * | 12/2008 | ............. G01S 13/42 |
| WO | WO-2009144435 A1 | * | 12/2009 | ............. G01S 13/42 |
| WO | WO-2015008310 A1 | * | 1/2015 | ......... G01S 13/9023 |
| WO | WO-2016030656 A1 | * | 3/2016 | ........... G01S 13/003 |
| WO | 2018/123748 A1 | | 7/2018 | |
| WO | 2019/087673 A1 | | 5/2019 | |

OTHER PUBLICATIONS

TaichiTanaka et al.,"Persistent Scatterer Clustering for Structure Displacement Analysis Based on Phase Correlation Network",2017 IEEE internationa lGeoscienceand Remote Sensing Symposium GGARSS}, FortWorth,T X, USA, Jul. 23-28, 2017, pp. 4618-4621. (Year: 2017).*

DaisukeIKEFUJIet al.,"Two-dimensional Displacement Anaiysisof Ground Area with SAR Images Basedon Persistent Scatter Clustering",Proceedings of the 2078 IEICE General Conference (Comraunication1), TokyoJapari, Mar. 20-23, 2018, B-2-44,p. 202. (Year: 2018).*

Alexander Schuner Tetal.,"Matching of Persistent Scatterers to buildings", 2072 [EEE International Geoscience and Remote Sensing Symposhim, Munich, Germany, Jul. 22-27, 2072, pp. 5733-5738. (Year: 2007).*

Alexander Schunert atal,Assignment of Persistent Scatterere to Buildings, HEEE Transactionson Geoscience and Remote Sensing,vol. 64, No. 6, Jun. 2016, pp. 3446-3427 (Year: 2016).*

Daniele Perissin et al.,"Ursan-Target Recoqnitionby Meansof Repeated Spaceborne SAR images", JEEE Transactionson Geoscience and Remote Sensing, val.45, No. 12, Dec. 2007,pp. 4043-4058. (Year: 2007).*

International Search Report for PCT Application No. PCT/JP2019/014021, dated Jun. 25, 2019.

English translation of Written opinion for PCT Application No. PCT/JP2019/014021, dated Jun. 25, 2019.

Alessandra Ferretti et al., "Permanent scatterers in SAR interferometry", IEEE 1999 International Geoscience and Remote Sensing Symposium. IGARSS'99, 1999, pp. 1528-1530 vol. 3.

Taichi Tanaka et al., "Persistent Scatterer Clustering for Structure Displacement Analysis Based on Phase Correlation Network", 2017 IEEE International Geoscience and Remote Sensing Symposium (IGARSS), Fort Worth, TX, USA, Jul. 23-28, 2017, pp. 4618-4621.

Daisuke Ikefuji et al., "Two-dimensional Displacement Analysis of Ground Area with SAR Images Based on Persistent Scatter Clustering", Proceedings of the 2018 IEICE General Conference (Communication 1). Tokyo Japan, Mar. 20-23, 2018, B-2-43, p. 202.

Alexander Schunert et al., "Matching of Persistent Scatterers to buildings", 2012 IEEE International Geoscience and Remote Sensing Symposium, Munich, Germany, Jul. 22-27, 2012, pp. 5733-5736.

Alexander Schunert et al., "Assignment of Persistent Scatterers to Buildings", IEEE Transactions on Geoscience and Remote Sensing, vol. 54, No. 6, Jun. 2016, pp. 3116-3127.

Daniele Perissin et al., "Urban-Target Recognition by Means of Repeated Spaceborne SAR Images", IEEE Transactions on Geoscience and Remote Sensing, vol. 45, No. 12, Dec. 2007. pp. 4043-4058.

* cited by examiner

SYNTHETIC-APERTURE-RADAR IMAGE PROCESSING DEVICE AND IMAGE PROCESSING METHOD

This application is a National Stage Entry of PCT/JP2019/014021 filed on Mar. 29, 2019, the contents of all of which are incorporated herein by reference, in their entirety.

TECHNICAL FIELD

The present invention relates to an image processing device and an image processing method, for a synthetic aperture radar, that automatically associates a reflection point in an observation image with which structure on a map a reflection signal is from.

BACKGROUND ART

Synthetic aperture radar (SAR) technology is a technology which can obtain an image equivalent to the image by an antenna having a large aperture, when a flying object such as artificial satellite, aircraft, or the like transmits and receives a radio wave while the flying object moves. The synthetic aperture radar is utilized, for example, for imaging ground surface undulations, structures, etc. by signal-processing reflected waves from the ground surface.

Non patent literature 1 describes a method of calculating the displacement speed of a reflection point from time-series observation images of a synthetic aperture radar and deriving displacement tendency of the entire observation range. The displacement speed represents an amount of landslide (displacement magnitude) of the ground surface or a structure during the observation period.

There are several analysis methods for time-series observation images, such as Persistent scatterer interferometry and Small baseline subset. These analysis methods select the effective reflection points for displacement analysis from the time-series observation images, and calculate the displacement speed of the reflection points.

The position of the reflection point (coordinates expressed in latitude, longitude, etc.) can be calculated from a condition at the time of observation. The time-series analysis method of synthetic aperture radar is used to calculate the displacement speed of the structure corresponding to the position of the reflection point. Structures are not limited to buildings. Roads and ground are also included in structures.

FIG. 16 is an explanatory diagram schematically showing a state that reflection points 410 are obtained in an area with structures such as a road 401 and a building 402. In FIG. 16, each of the black circles indicates a reflection point 410.

Non patent literature 2 describes a method of clustering reflection points for time-series analysis of synthetic aperture radar. According to the method described in the non patent literature 2, it is possible to group reflection points along the shape of the structure, based on a position and a phase information of the reflection points.

In the method described in the non patent literature 2, an MST (minimum spanning tree) is first constructed from multiple reflection points. Next, for each edge, a weight related to the position and phase of the reflection point is calculated. Then, edges whose weights are greater than a predetermined value (for example, a sum of the average value and the standard deviation of the weight of each edge) are separated, and multiple clusters are generated.

FIG. 17 is an explanatory diagram schematically showing a state that reflection points are clustered. FIG. 17 illustrates a reflection point cluster 420 on a road and a reflection point cluster 430 on a building.

CITATION LIST

Non Patent Literature

NPL 1: A. Ferretti, "Permanent scatterer in sar interferometry," IEEE Trans. Geoscience and Remote Sensing, vol. 39, no. 1, pp. 8-20, 2001.

NPL 2: T. Tanaka and O. Hoshuyama, "Persistent scatterer clustering for structure displacement analysis based on phase correlation network," IEEE International Geoscience and Remote Sensing Symposium, pp. 4618-4621, 2017

SUMMARY OF INVENTION

Technical Problem

It takes an enormous amount of time to visually associate the reflection points and reflection point groups (reflection point clusters) used in the time-series analysis of synthetic aperture radar with structures. In addition, the coordinates of the reflection points used in the time-series analysis of synthetic aperture radar can be calculated from a condition at the time of observation, but in reality, the coordinates of the reflection points include positional deviations equivalent to the resolution of used synthetic aperture radar. Furthermore, due to noise, orbital deviation, etc., the coordinates of the reflection points may be calculated at a position that is a few pixels wrong from the position of the truly corresponding structure. Therefore, in locations where different structures are in close proximity, it is difficult to associate each reflection point or reflection point clusters with a structure, based on distance alone.

In addition, the appearance of reflection points and reflection point clusters depends on used synthetic aperture radar and the observation area. Therefore, there is still a possibility that the accuracy of the correspondence will be greatly degraded only by the uniquely defined indices and parameters in the system.

It is an object of the present invention to provide a synthetic aperture radar image processing device and an image processing method that can automatically associate reflection point clusters obtained by time-series analysis of synthetic aperture radar with structures on a map. It is also an object of the present invention to make it possible to automatically select reflection point clusters and corresponding types of structures on the map. Furthermore, it is an object of the present invention to enable the associating to be carried out automatically and with stable accuracy, independent of various observation conditions.

Solution to Problem

A synthetic aperture radar image processing device according to the present invention includes time-series analysis means for extracting persistent scatterers from time-series observation data for the observation direction for an observation area observed from multiple observation directions by a radar, and calculating displacement speeds of the extracted persistent scatterers, clustering means for generating reflection point clusters by clustering extracted persistent scatterers based on their phase and position, distance calculation means for calculating a distance between each of the persistent scatterers included in the reflection point clusters and each structure included in the observation area, representative value calculation means for calculating each representative value for the distance between each persistent scatterer and each structure, for each reflection point cluster, and corresponding structure determination means for associating the structure corresponding to the smallest representative value with the persistent scatterer, for each reflection point cluster.

A synthetic aperture radar image processing method according to the present invention includes extracting persistent scatterers from time-series observation data for the observation direction for an observation area observed from multiple observation directions by a radar, and calculating displacement speeds of the extracted persistent scatterers, generating reflection point clusters by clustering extracted persistent scatterers based on their phase and position, calculating the distances between each of the persistent scatterers included in the reflection point clusters and structures included in the observation area, calculating a distance between each of the persistent scatterers included in the reflection point clusters and each structure included in the observation area, calculating each representative value for the distance between each persistent scatterer and each structure, for each reflection point cluster, and associating the structure corresponding to the smallest representative value with the persistent scatterer, for each reflection point cluster.

A synthetic aperture radar image processing program according to the present invention causes a computer to execute, a process of extracting persistent scatterers from time-series observation data for the observation direction for an observation area observed from multiple observation directions by a radar, and calculating displacement speeds of the extracted persistent scatterers, a process of generating reflection point clusters by clustering extracted persistent scatterers based on their phase and position, a process of calculating the distances between each of the persistent scatterers included in the reflection point clusters and structures included in the observation area, a process of calculating a distance between each of the persistent scatterers included in the reflection point clusters and each structure included in the observation area, a process of calculating each representative value for the distance between each persistent scatterer and each structure, for each reflection point cluster, and a process of associating the structure corresponding to the smallest representative value with the persistent scatterer, for each reflection point cluster.

Advantageous Effects of Invention

According to this invention, it is possible to automatically associate reflection point clusters obtained by the time-series analysis of synthetic aperture radar with structures on a map. It also makes it possible to automatically select reflection point clusters and corresponding types of structures on the map. Furthermore, the associating is automatically carried out with stable accuracy, independent of various observation conditions.

DESCRIPTION OF EMBODIMENTS

Hereinafter, the example embodiment of the present invention is described with reference to the drawings.

Example Embodiment 1

Figure 1:
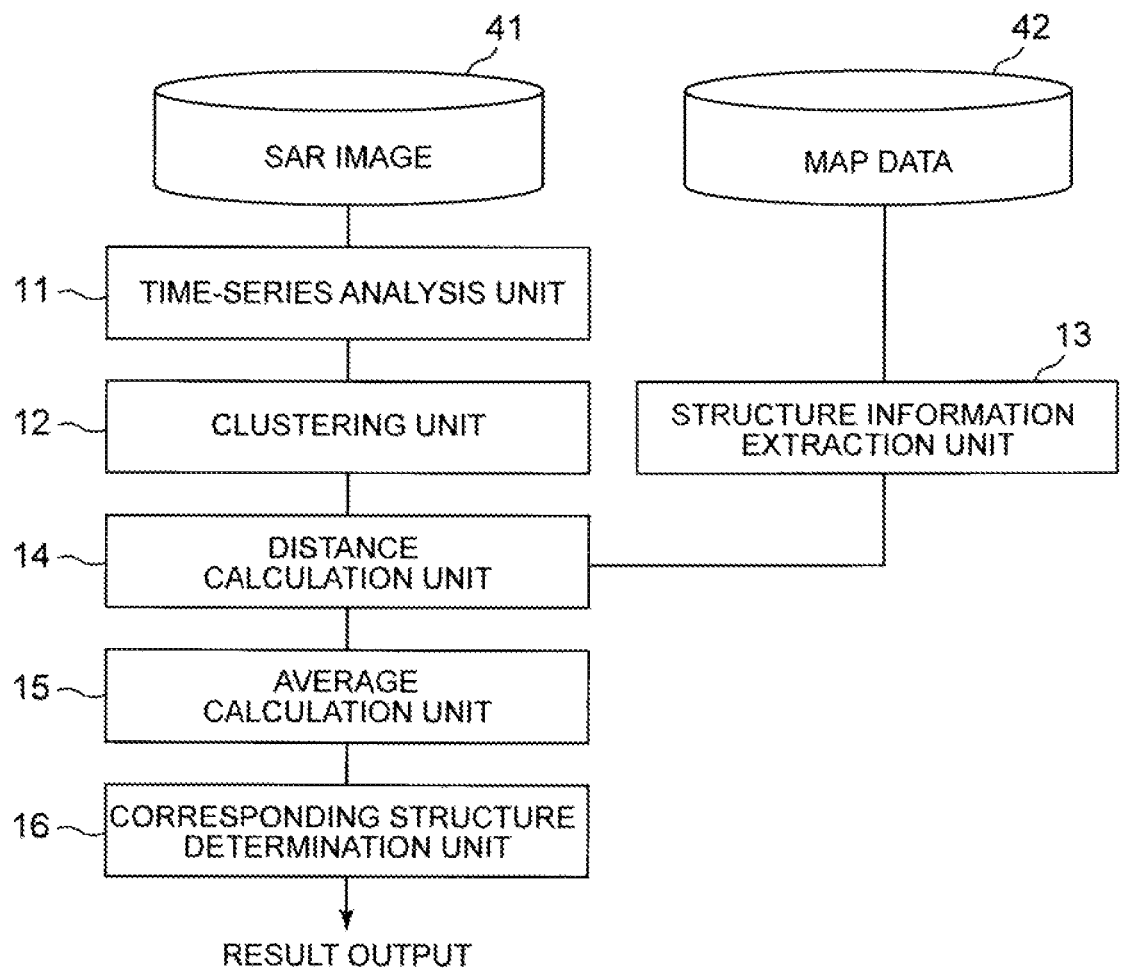
FIG. 1 It depicts a block diagram showing a configuration example of a synthetic aperture radar image processing device of the first example embodiment.

FIG. 1 is a block diagram showing a configuration example of a synthetic aperture radar image processing device of the first example embodiment. The image processing device shown in FIG. 1 includes a time-series analysis unit 11, a clustering unit 12, a structure information extraction unit 13, a distance calculation unit 14, an average calculation unit 15, and a corresponding structure determination unit 16. The time-series analysis unit 11 and the clustering unit 12 are connected so that they can transmit and receive (input and output) data. The distance calculation unit 14 is connected to the clustering unit 12, the structure information extraction unit 13, and the average calculation unit 15 so that they can transmit and receive (input and output) data. The average calculation unit 15 and the corresponding structure determination unit 16 are connected so that they can transmit and receive (input and output) data.

The time-series analysis unit 11 receives a time-series SAR image (SAR data) obtained by the synthetic aperture radar as an input, and analyzes the input SAR image in a time-series manner. The SAR image is an observation image data that contains two-dimensional phase information. In this example embodiment, it is assumed that the SAR image is stored in the storage unit 41. However, it is not essential that the SAR image be stored in the storage means. The SAR image may be input to the image processing device accordingly.

The time-series analysis unit 11 extracts stable reflection points (Persistent Scatterers) from the input SAR image. The persistent scatterer is a point (scatterer) that reflects a stable signal without degradation of coherence over a long period of time (at least, an observation period). The time-series analysis unit 11 performs analysis on the extracted persistent scatterers and calculates the displacement speed and position (coordinates) of each persistent scatterer. The persistent scatterer is, for example, a point that has good interferometric properties when time-series SAR images are interfered with. For example, Persistent scatterer interferometry described in the non patent literature 1 is used as a time-series analysis method. Persistent scatterer interferometry is a method which extracts persistent scatterers and performs displacement analysis on them. After the time-series analysis, the persistent scatterer is assigned a reflection point number in addition to its position and displacement speed.

The clustering unit 12 clusters the persistent scatterers analyzed by the time-series analysis unit 11. As a clustering method, the clustering method based on the position and phase information of each reflection point described in the non patent literature 2 can be used, for example. Each of the clustered persistent scatterers is assigned a cluster number. The cluster number corresponds to data that can identify the reflection point cluster.

The structure information extraction unit 13 inputs map data from the storage unit 42 in which information on structures such as roads, buildings, and ground are recorded as map information (map data). As the information of the structures, a location (coordinates), shape, and type of the structures are input to the map data, for example. The types of structures include, for example, roads, buildings, ground, grassland, and forests. The structure information extraction unit 13 extracts the information of structures included in the observation area from the input map data for each structure and assigns a structure number to each structure. It is not essential that the map data be stored in the storage means. The map data may be input to the image processing device accordingly.

Figure 2:
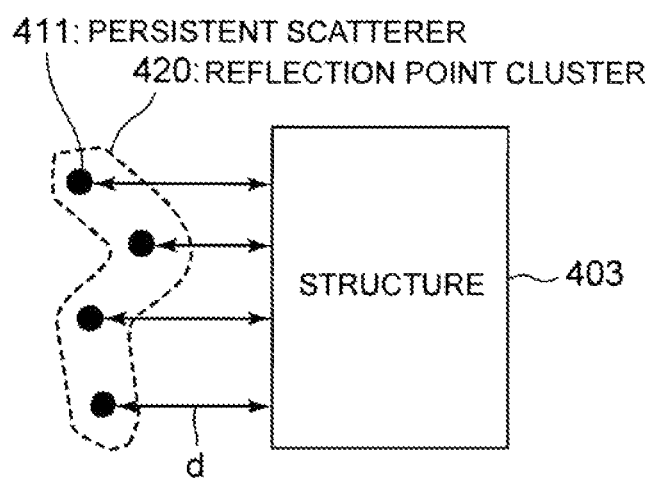
FIG. 2 It depicts an explanatory diagram to explain a distance between a reflection point and a structure.

The distance calculation unit 14 calculates a distance between each persistent scatterer and each structure that constitutes the reflection point cluster from the each location information. The distance between a persistent scatterer and a structure is, for example, the shortest path d when the contours of the persistent scatterer 411 and the structure 403 are connected by a straight line, as shown in FIG. 2. As the distance between the persistent scatterer 411 and the structure 403, the straight-line distance when connecting the center or the center of gravity of the persistent scatterer and the structure may be used.

The average calculation unit 15 calculates the average value of the distances between one or more persistent scatterers (persistent scatterers included in the reflection point cluster) which are components, and the structure, for each reflection point cluster, for each structure. Instead of the average value, a median value or a mode value may be used.

The corresponding structure determination unit 16 searches for the structure with the smallest average distance value and obtains the structure number of the searched structure, for each reflection point cluster. Then, for each reflection point cluster, the corresponding structure determination unit 16 assigns the obtained structure number to the persistent scatterer that is a component. In other words, the corresponding structure determination unit 16 determines the structure corresponding to each persistent scatterer.

Figure 3:
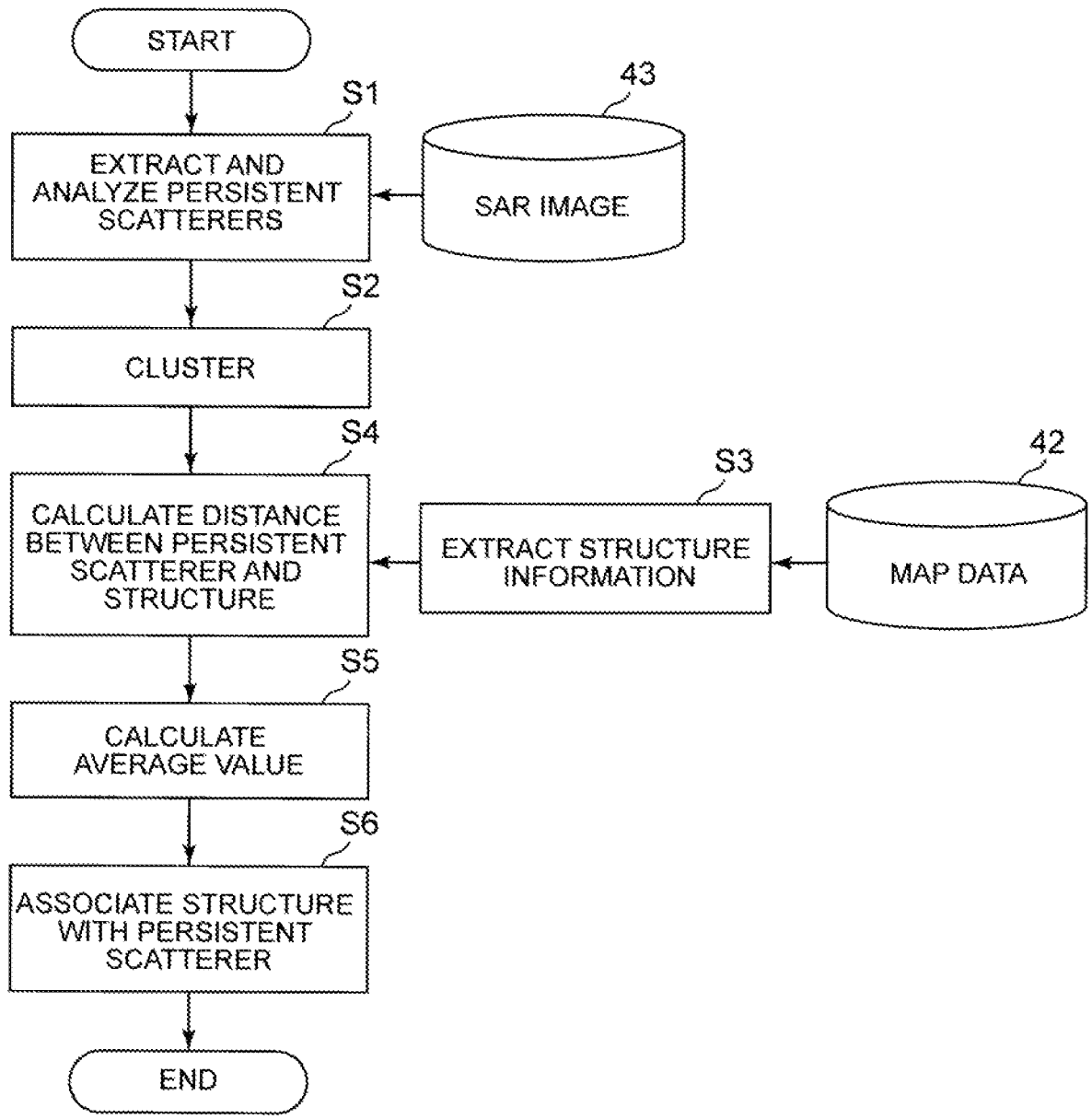
FIG. 3 It depicts a flowchart showing an example of an operation of an image processing device of the first example embodiment.

Next, the operation of the image processing device will be described with reference to a flowchart in FIG. 3. FIG. 3 is a flowchart showing an example of the operation of the image processing device of the first example embodiment.

The time-series analysis unit 11 inputs time-series observation data (time-series SAR images) obtained by synthetic aperture radar from the storage unit 41. The time-series analysis unit 11 extracts persistent scatterers from the time-series observation data and analyzes the persistent scatterers (step S1). In step S1, the time-series analysis unit 11 calculates displacement speed for each persistent scatterer, for example. Then, the time-series analysis unit 11 assigns information on the position, displacement speed, and phase, as well as the reflection point number, to the extracted persistent scatterers, and outputs the persistent scatterers to the clustering unit 12. As described above, the time-series analysis unit 11 uses a time-series analysis method such as Persistent scatterer interferometry, for example, as a method for extracting persistent scatterers and analyzing displacement speed.

The clustering unit 12 clusters the input persistent scatterers based on the position and phase information of the persistent scatterers (step S2). Then, the clustering unit 12 assigns cluster numbers to the clustered persistent scatterers and outputs the persistent scatterers to the distance calculation unit 14. In this example embodiment, the clustering unit 12 uses the method described in the non patent literature 2 as a clustering method, for example.

The structure information extraction unit 13 extracts information such as the location, shape, and type of structure for each structure from the input map data. Then, the structure information extraction unit 13 assigns a structure number to each structure and outputs the structure information to the distance calculation unit 14 (step S3).

The distance calculation unit 14 calculates the distances between the persistent scatterers assigned the same cluster number and each structure based on the respective location information (step S4). The distance calculation unit 14 then outputs the calculated distances to the average calculation unit 15.

The average calculation unit 15 calculates the average value of the input distances for each cluster number, i.e., for each reflection point cluster, and for each structure (step S5). The average calculation unit 15 outputs the calculated average value to the corresponding structure determination unit 16. Instead of the average value, a median value or a mode value may be calculated and output to the corresponding structure determination unit 16.

The corresponding structure determination unit 16 searches for the structure with the smallest average distance for each cluster number, and obtains the structure number of the searched structure. Then, the corresponding structure determination unit 16 assigns the obtained structure number to the persistent scatterers having the same cluster number (step S6).

In this example embodiment, the image processing device uses the average or median value of the distance between each reflection point that constitutes a reflection point cluster and a structure on the map data as degree of correspondence between the reflection point cluster and the structure. Therefore, the image processing device can automatically associate the reflection points with the structures on the map.

Example Embodiment 2

Figure 4:
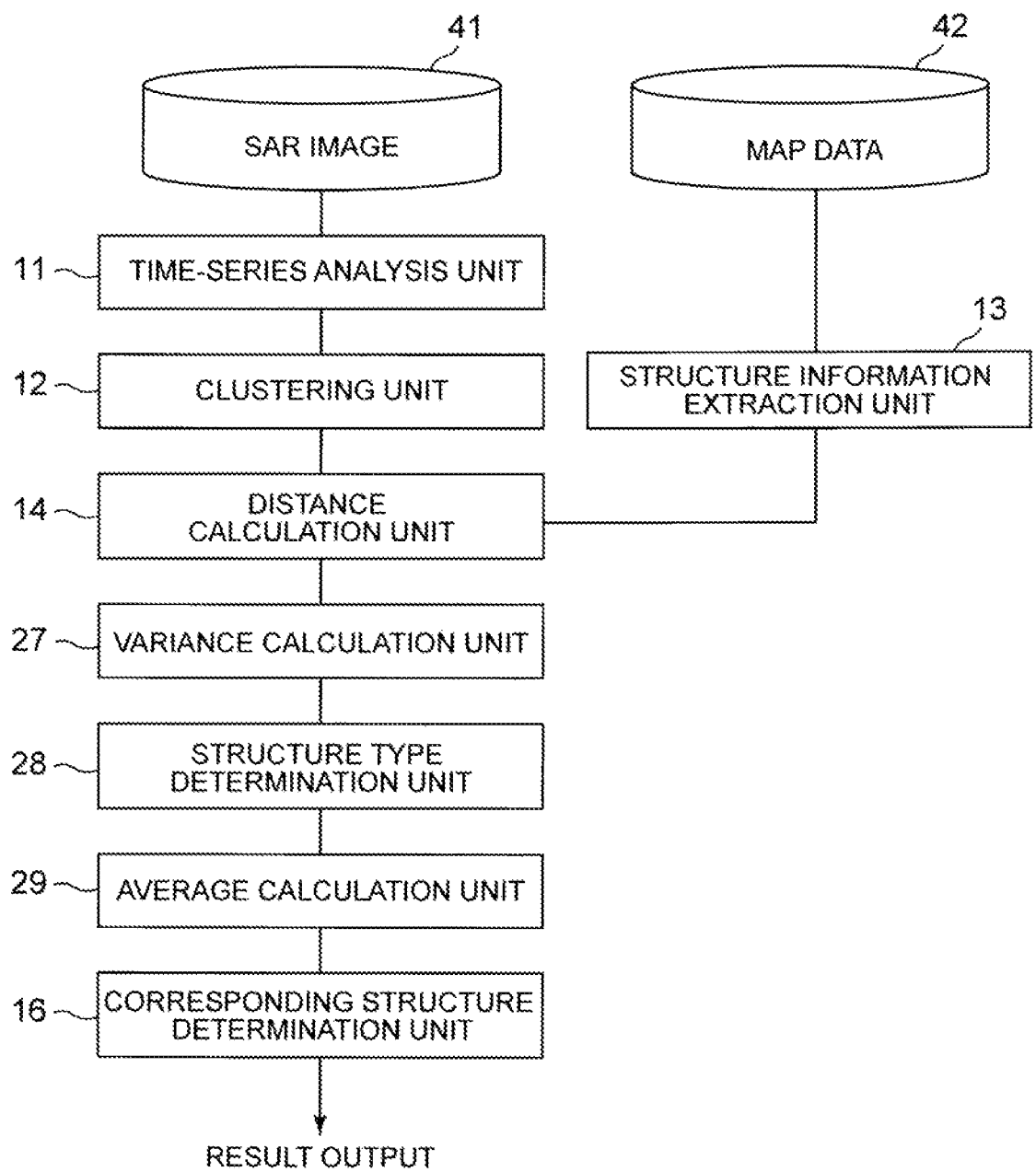
FIG. 4 It depicts a block diagram showing a configuration example of a synthetic aperture radar image processing device of the second example embodiment.

FIG. 4 is a block diagram showing a configuration example of a synthetic aperture radar image processing device of the second example embodiment. The image processing device shown in FIG. 4 includes a time-series analysis unit 11, a clustering unit 12, a structure information extraction unit 13, a distance calculation unit 14, a variance calculation unit 27, a structure type determination unit 28, an average calculation unit 29, and a corresponding structure determination unit 16.

The variance calculation unit 27 calculates the variance of the distance between the persistent scatterers which are components and the structure for each reflection point cluster, for each structure. The variance is an example. Other indicators representing distance variation such as quantile deviation, etc. may be used. A representative value of distances such as an average or mode value may also be used.

The structure type determination unit 28 obtains the variance value corresponding to the structure with the smallest distance variance value, for each reflection point cluster. The structure type determination unit 28 performs clustering on a set of obtained variance values. The number of classes is set to three or more. Then, the structure type determination unit 28 determines the reflection point cluster that belongs to the class with the smallest variance value among the set of variance values after clustering as the reflection point cluster corresponding to a road structure. The structure type determination unit 28 determines the reflection point cluster that belongs to the class with the highest variance value as the reflection point cluster corresponding to a grassland or ground structure. The structure type determination unit 28 determines the other reflection point clusters as the reflection point clusters corresponding to the building structures. In the case where the structure type (type of structure) is divided by the scale (size) of the building, the reflection point clusters belonging to the class of the set with the larger variance value correspond to a large-scale building structure such as a high-rise building.

Figure 5:
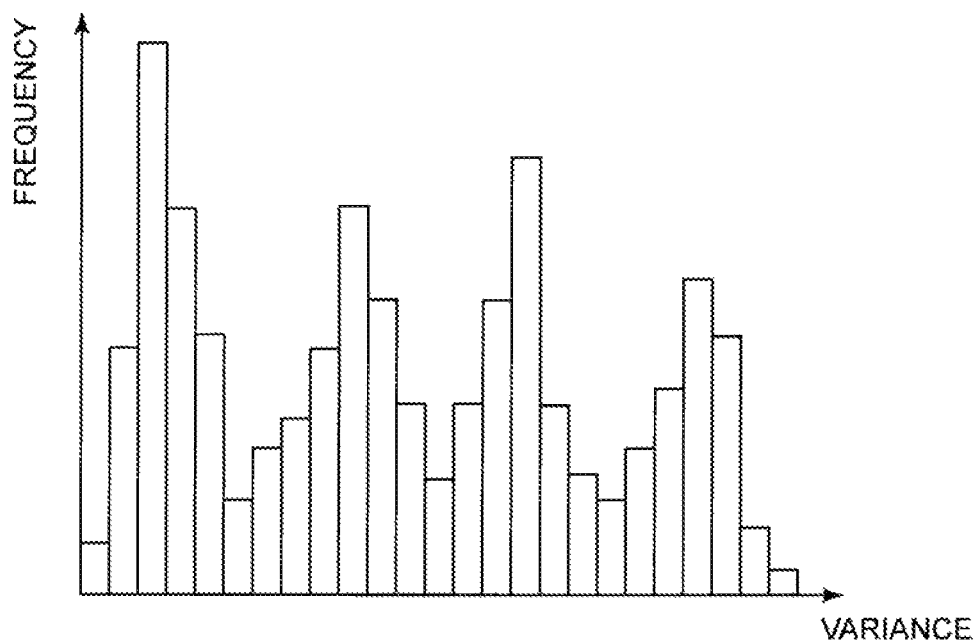
FIG. 5 It depicts an explanatory diagram showing an example of a histogram of variance values.
Figure 6:
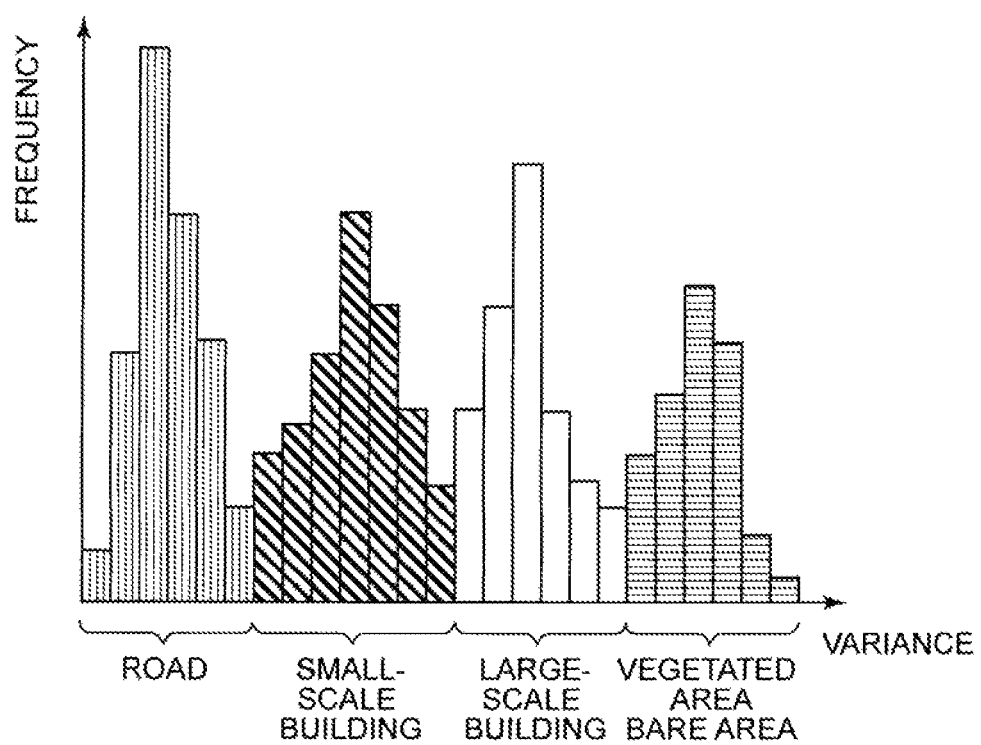
FIG. 6 It depicts an explanatory diagram showing a method to determine a structure type based on the clustering of variance values.

When a histogram of variance values as illustrated in FIG. 5 is obtained, classification is done as illustrated in FIG. 6 when four classes clustering is performed as an example. In other words, the structure type corresponding to each classification is determined. The histograms illustrated in FIG. 5 and FIG. 6 are examples. The structure type determination unit 28 may determine the number of classes using a density function or other method.

The average calculation unit 29 calculates, for each structure, an average of distances to corresponding structures of the structure types determined by the structure type determination unit 28, for each reflection point cluster.

The other components are the same as those shown in FIG. 1.

Figure 7:
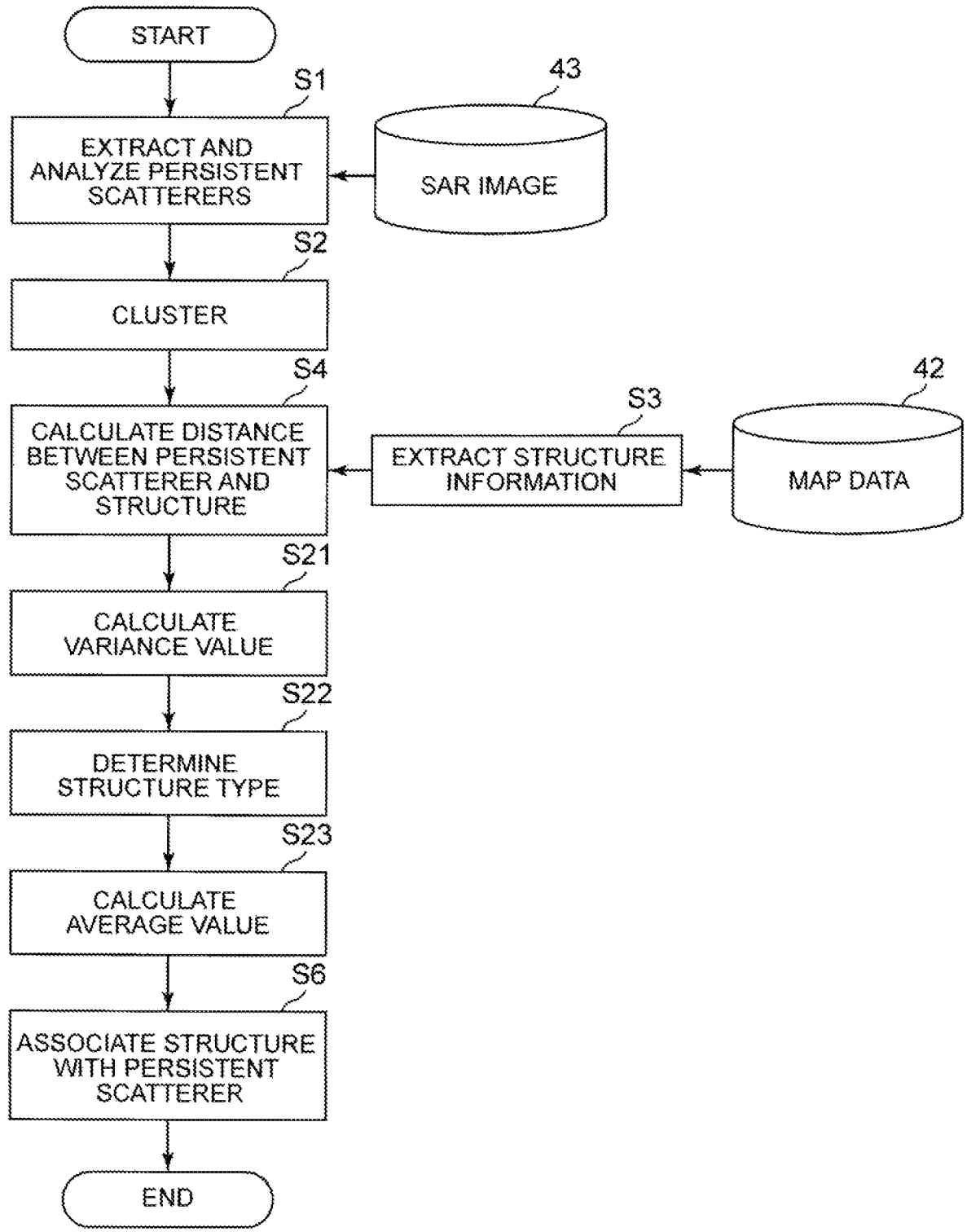
FIG. 7 It depicts a flowchart showing an example of an operation of an image processing device of the second example embodiment.

Next, the operation of the image processing device will be described with reference to the flowchart in FIG. 7. FIG. 7 is a flowchart showing an example of the operation of the image processing device of the second example embodiment.

The process of steps S1 to S4 is the same as the process in the first example embodiment. However, in this example embodiment, the distance calculation unit 14 outputs calculated distances to the variance calculation unit 27.

The variance calculation unit 27 calculates, for each cluster number, the variance value of the distance input from the distance calculation unit 14 for each structure. The variance calculation unit 27 outputs the calculated variance values to the structure type determination unit 28 (step S21). As described above, the variance value is an example. The variance calculation unit 27 may calculate a quartile deviation, an average value, a mode value, or the like, and output it to the structure type determination unit 28.

The structure type determination unit 28 obtains the smallest variance value for each cluster number. Then, the structure type determination unit 28 performs clustering on the set of variance values obtained for each cluster number. The structure type determination unit 28 uses a k-means method, etc., when performing clustering. The number of classes is three or more.

In step S22, the structure type determination unit 28 determines that in the set of variance values after clustering, the cluster number (data that can identify the reflection point cluster) belonging to the set with the smallest variance value corresponds to a road structure. The structure type determination unit 28 determines that the cluster number belonging to the set with the highest variance value corresponds to a grassland or ground structure. The structure type determination unit 28 determines that the other cluster numbers correspond to building structures. Then, the structure type determination unit 28 assigns to each set a name or a number of the structure type corresponding to each cluster number. Such a method of determining the structure type is an example. For example, when there are multiple types of road structures, the structure type determination unit 28 may determine that the two sets with the smallest variance values correspond to road structures.

The average calculation unit 29 calculates, for each cluster number, an average value of the distance between the persistent scatterer and each structure with the number of the structure type assigned to it (step S23). In other words, the average calculation unit 29 performs the average value calculation for the structure of the type associated with the reflection point cluster, for each reflection point cluster. Then, the average calculation unit 29 outputs average values to the corresponding structure determination unit 16.

The corresponding structure determination unit 16 obtains the structure number of the structure with the smallest average distance value, for each cluster number, and assigns the obtained structure number to the persistent scatterers that are assigned the same cluster number (step S6).

In this example embodiment, the image processing device identifies which structure type the reflection point cluster corresponds to, using the variance of the distance between the reflection point cluster and each structure. Then, the image processing device determines the structures that correspond to the structure types. The appearance of the persistent scatterers depends on the shape of the structure. For example, the persistent scatterers obtained at a curb of a road are distributed in a linear shape. The persistent scatterers obtained on a wall surface such as a building are distributed in a plane shape. In this example embodiment, errors in associating the persistent scatterer with the structure which has the same cluster number as it of the the persistent scatterer are reduced, even for a location where a road and a building is close to each other, which are difficult to discriminate based on an average value alone. Therefore, the accuracy of automatic associating is further improved.

Example Embodiment 3

Figure 8:
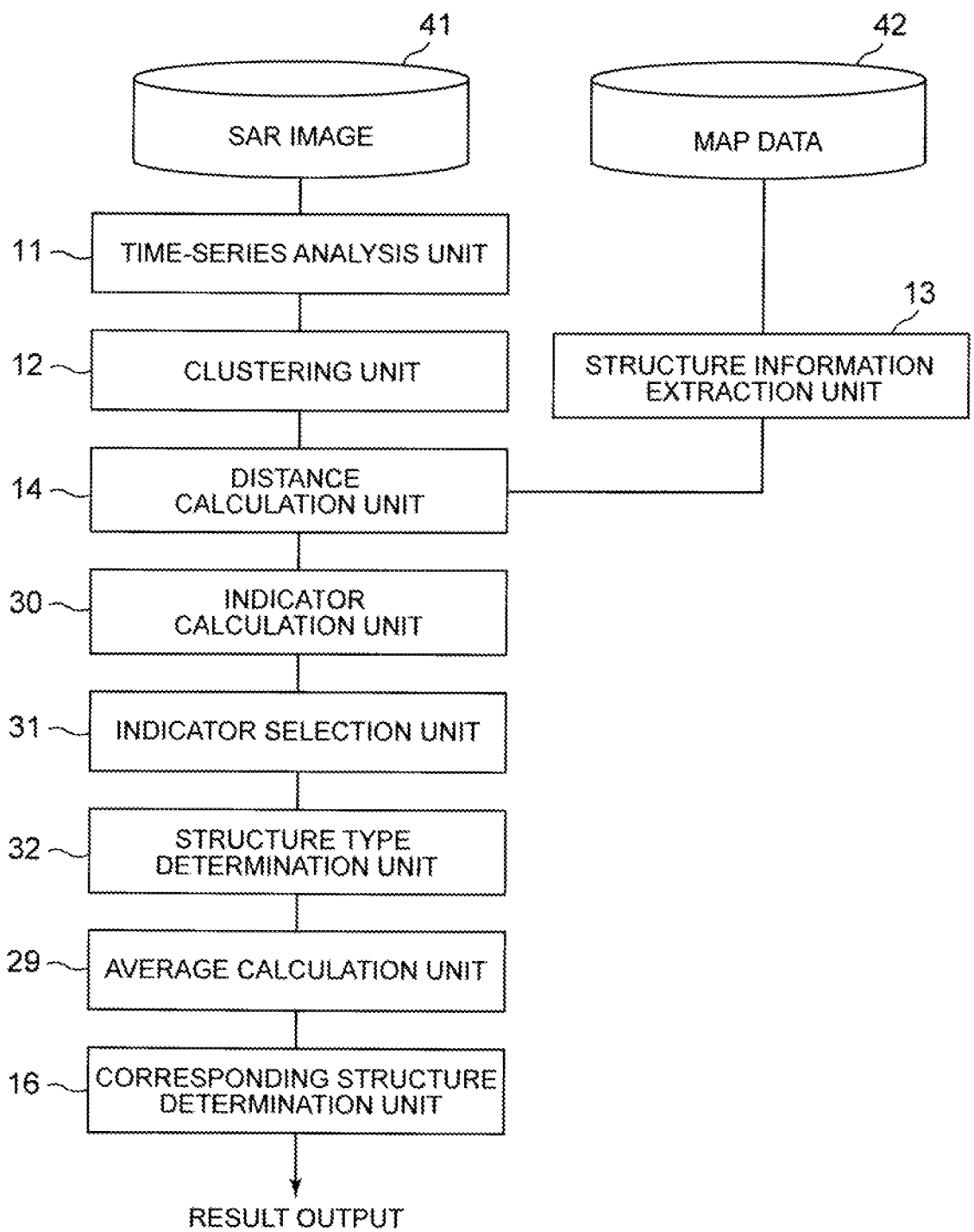
FIG. 8 It depicts a block diagram showing a configuration example of a synthetic aperture radar image processing device of the third example embodiment.

FIG. 8 is a block diagram showing a configuration example of a synthetic aperture radar image processing device of the third example embodiment. The image processing device shown in FIG. 8 includes a time-series analysis unit 11, a clustering unit 12, a structure information extraction unit 13, a distance calculation unit 14, an indicator calculation unit 30, an indicator selection unit 31, a structure type determination unit 32, an average calculation unit 29, and a corresponding structure determination unit 16.

The indicator calculation unit 30 calculates values of a plurality of predetermined indicators of the distance between the persistent scatterers which are components and the structure, for each reflection point cluster. The predetermined values of the indicators include, for example, an average value, a median value, a mode value, a variance value, and a quartile deviation.

The indicator selection unit 31 obtains the smallest value of each indicator and performs clustering for each indicator on the set of obtained values, for each reflection point cluster. The number of classes is three or more. Then, the indicator selection unit 31 calculates overlaps of respective classes after clustering for each indicator, and selects the indicator with the least overlap.

Figure 9:
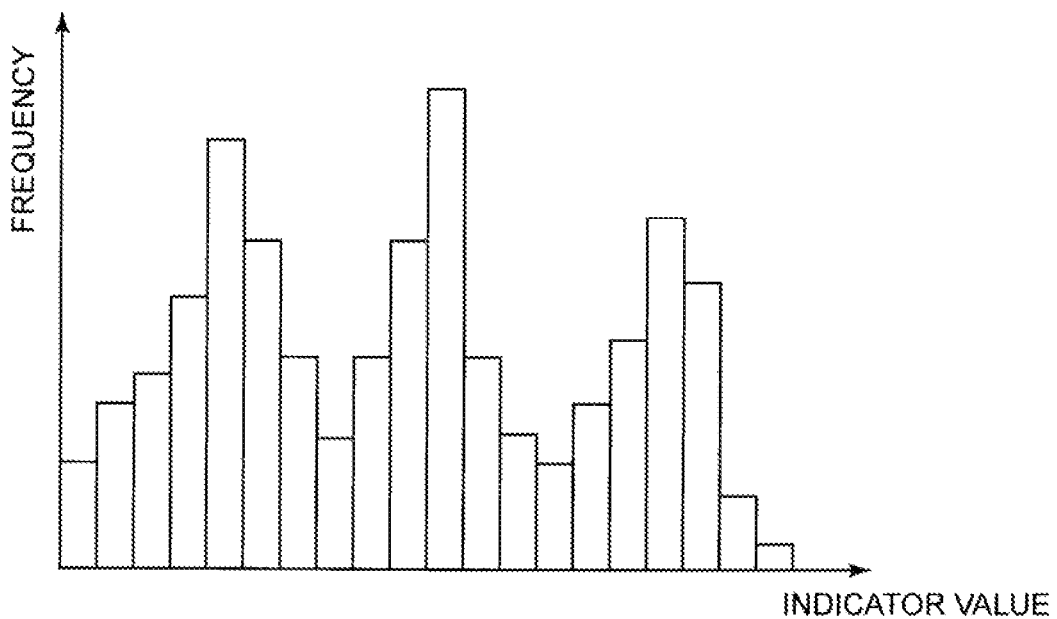
FIG. 9 It depicts an explanatory diagram showing an example of a histogram with the horizontal axis being an indicator value for an arbitrary indicator.
Figure 10:
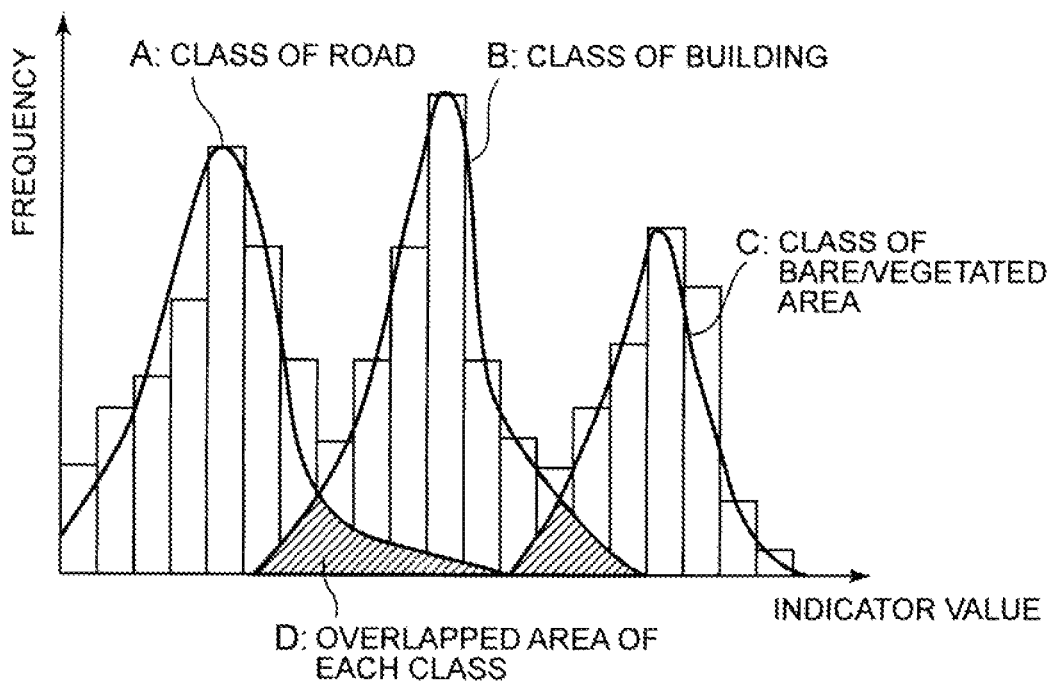
FIG. 10 It depicts an explanatory diagram showing an example of a class classification.

FIG. 9 is an explanatory diagram showing an example of a histogram with the horizontal axis being the indicator value for an arbitrary indicator. When a three-class classification is performed on the set of indicator values illustrated in FIG. 9, classes are represented by three graphs as illustrated in FIG. 10. The overlapped area D of classes is represented by the area of the shaded area in FIG. 10. Class A of the road, Class B of the building, and Class C of the bare/vegetated area are illustrated in FIG. 10.

The histograms shown in FIG. 9 and FIG. 10 are examples. The overlap of classes may be evaluated using a density function or other methods. If the indicator with the least overlap of classes can be determined or predicted in advance, the indicator selection unit 31 performs clustering using that indicator and outputs the clustering results to the structure type determination unit 32.

The structure type determination unit 32 determines the type of structure in the same way as in the second example embodiment. However, in this example embodiment, the structure type determination unit 32 uses indicators selected by the indicator selection unit 31. Specifically, the structure type determination unit 32 determines the reflection point cluster that belongs to the class with the smallest variance value for the clustering result based on the selected indicator as the reflection point cluster corresponding to a road structure. The structure type determination unit 32 determines the reflection point cluster that belongs to the class with the highest variance value as the reflection point cluster corresponding to a grassland or ground structure. The structure type determination unit 32 determines the other reflection point clusters as the reflection point clusters corresponding to building structures.

The above determination of the structure type is an example. For example, when there are multiple types of road structures, the multiple reflection point clusters with small variance values may be used as the reflection point cluster corresponding to the road structure. In addition, when there are multiple areas with different densities of plants such as forests and lawns, the reflection point cluster with a large variance value may be used as the reflection point cluster corresponding to the grassland or ground structure.

Then, as in the case of the second example embodiment, the structure number of the structure corresponding to the reflection point cluster is assigned by the average calculation unit 29 and the corresponding structure determination unit 16 (step S23, S6).

The other components are the same as those shown in FIG. 4.

Figure 11:
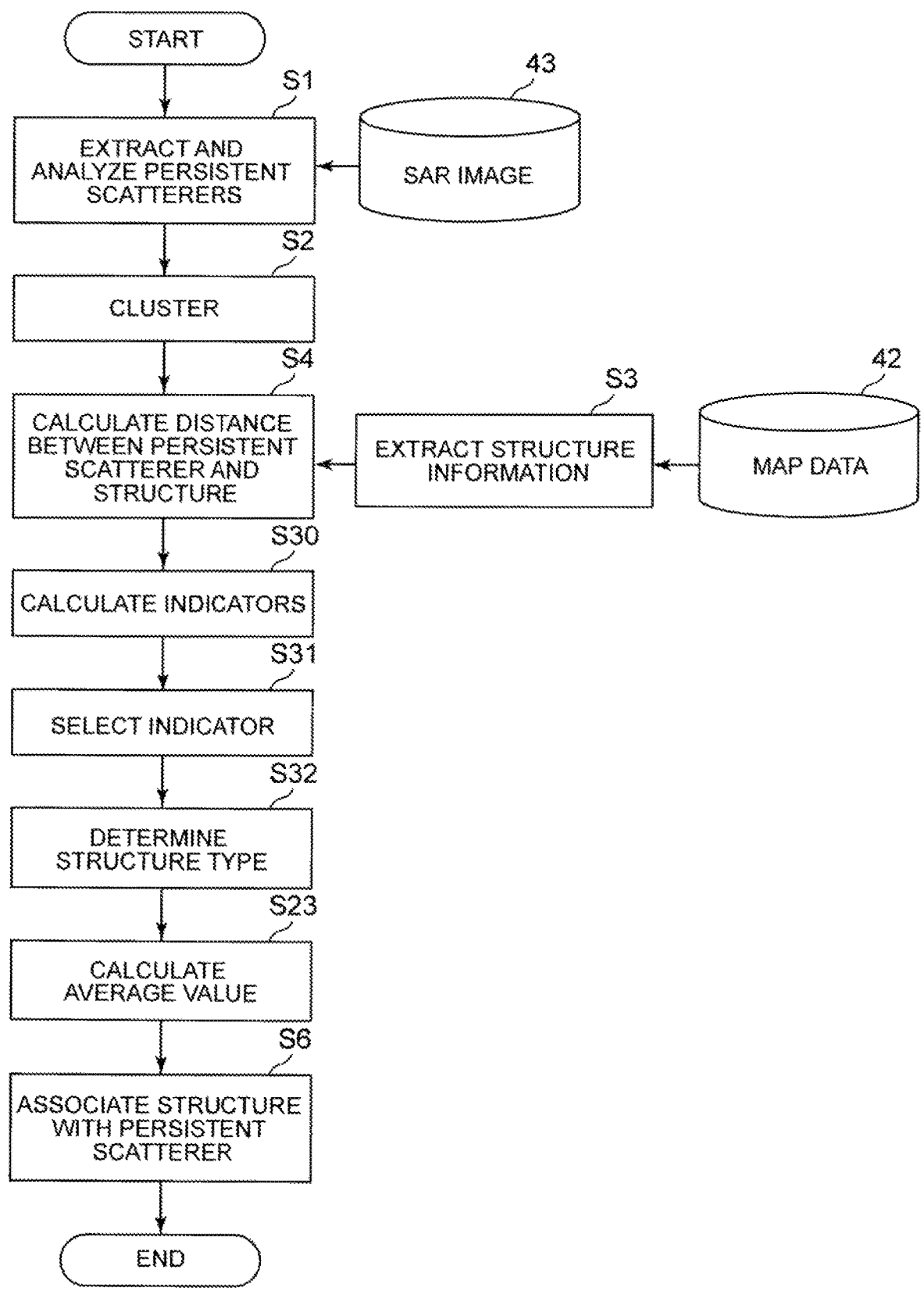
FIG. 11 It depicts a flowchart showing an example of an operation of an image processing device of the third example embodiment.

Next, the operation of the image processing device will be described with reference to the flowchart in FIG. 11. FIG. 11 is a flowchart showing an example of the operation of the image processing device of the third example embodiment.

The process of steps S1 to S4 is the same as the process in the first example embodiment and the process in the second example embodiment. However, in this example embodiment, the distance calculation unit 14 outputs calculated distances to the indicator calculation unit 30.

The indicator calculation unit 30 calculates the values of a plurality of predetermined indicators for the distance between the persistent scatterer and the structure, for each reflection point cluster (step S30). Then, the indicator calculation unit 30 outputs obtained respective values to the indicator selection unit 31. The predetermined indicator is, for example, an average value, a median value, a mode value, a variance value or a quartile deviation, as described above.

The indicator selection unit 31 obtains the smallest value of each indicator for each reflection point cluster. Then, the indicator selection unit 31 clusters a set of obtained indicator values so that they are divided into three or more classes. The indicator selection unit 31 uses, for example, a k-means method for clustering. The indicator selection unit 31 determines an overlap between each class and another class, for each indicator. The indicator selection unit 31 selects the indicator that has the smallest overlap with other classes (step S31).

In step S32, the structure type determination unit 32 determines that in the clustering result for the selected indicators, the reflection point cluster belonging to the class with the smallest variance value correspond to a road structure. The structure type determination unit 32 determines that the reflection point cluster belonging to the class with the highest variance value correspond to a grassland or ground structure. The structure type determination unit 32 determines that the other cluster numbers correspond to building structures.

Then, as in the case of the second example embodiment, the persistent scatterers with the same cluster number are assigned the structure number of the corresponding structure by the average calculation unit 29 and the corresponding structure determination unit 16 (Steps S23, S6).

In this example embodiment, the image processing device calculates a plurality of indicators for the distance between the reflection point cluster and each structure. The image processing device clusters a set of indicator values into multiple clusters, for each indicator. Then, the image processing device selects the indicators that are most effective in sorting the reflection point clusters into different types of structures by evaluating the overlap of each class for each indicator. In other words, the indicator selection unit 31 selects an effective indicator for each observation condition. The structure type determination unit 32 can accurately identify the type of structure to which the reflection point clusters correspond, independent of the observation condition, by using the selected indicators. Therefore, the image processing device can also accurately perform associating the persistent scatterer with the structure in an area where different types of structures are in close proximity.

Each component in each of the above example embodiments may be configured with a piece of hardware or a piece of software. Alternatively, the components may be configured with a plurality of pieces of hardware or a plurality of pieces of software. Further, part of the components may be configured with hardware and the other part with software.

The functions (processes) in the above example embodiments may be realized by a computer having a processor such as a central processing unit (CPU), a memory, etc. For example, a program for performing the method (processing) in the above example embodiments may be stored in a storage device (storage medium), and the functions may be realized with the CPU executing the program stored in the storage device. The time-series observation data and the map data may also be stored in the storage device.

Figure 12:
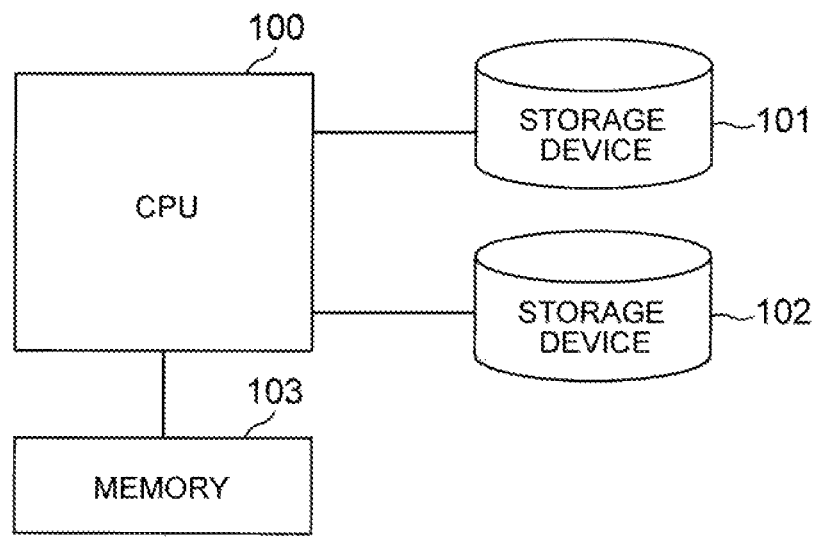
FIG. 12 It depicts a block diagram showing an example of a computer with a CPU.

FIG. 12 is a block diagram showing an example of a computer with a CPU. The computer is implemented in a synthetic aperture radar image processing device. The CPU 100 executes processing in accordance with a program stored in a storage device 101 using time-series analysis data and map data stored in the storage device 102 to realize the functions in the above example embodiments. That is to say, the functions of the time-series analysis unit 11, the clustering unit 12, the structure information extraction unit 13, the distance calculation unit 14, the average calculation unit 15, the corresponding structure determination unit 16, the variance calculation unit 27, the structure type determination unit 28, the average calculation unit 29, the indicator calculation unit 30, the indicator selection unit 31, and the structure type determination unit 32 in the synthetic aperture radar image processing devices shown in FIGS. 1, 4 and 8 are realized. The storage device 101 and the storage device 102 may be combined into one storage device.

The storage devices 101, 102 are, for example, non-transitory computer readable media. The non-transitory computer readable medium is one of various types of tangible storage media. Specific examples of the non-transitory computer readable media include a magnetic storage medium (for example, flexible disk, magnetic tape, hard disk), a magneto-optical storage medium (for example, magneto-optical disc), a compact disc-read only memory (CD-ROM), a compact disc-recordable (CD-R), a compact disc-rewritable (CD-R/W), and a semiconductor memory (for example, a mask ROM, a programmable ROM (PROM), an erasable PROM (EPROM), a flash ROM).

The program may be stored in various types of transitory computer readable media. The transitory computer readable medium is supplied with the program through, for example, a wired or wireless communication channel, or, through electric signals, optical signals, or electromagnetic waves.

The memory 103 is a storage means implemented by a RAM (Random Access Memory), for example, and temporarily stores data when the CPU 100 executes processing. It can be assumed that a program held in the storage devices 101, 102 or a temporary computer readable medium is transferred to the memory 103 and the CPU 100 executes processing based on the program in the memory 103.

It becomes possible to automatically perform analysis under the condition that observation data from multiple directions with different ways of seeing is integrated in displacement analysis for example using synthetic aperture radar with satellites and aircraft, by using each of the above example embodiments. One example of the analysis of observation data from multiple directions is a measurement of displacement of the ground and the structure, or the detection and identification of an object.

Figure 13:
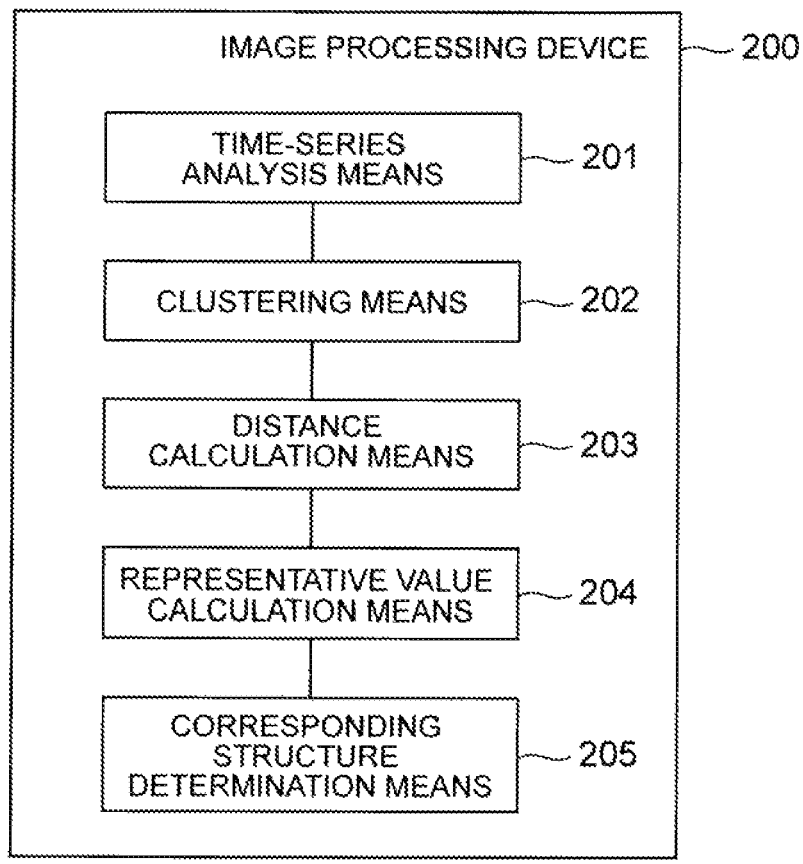
FIG. 13 It depicts a block diagram of a main part of a synthetic aperture radar image processing device.

FIG. 13 is a block diagram of a main part of the synthetic aperture radar image processing device. The image processing device 200 comprises
time-series analysis means 201 (realized by the time-series analysis unit 11 in the example embodiments) for extracting persistent scatterers from time-series observation data for the observation direction for an observation area observed from multiple observation directions by a radar, and calculating displacement speeds of the extracted persistent scatterers, clustering means 202 (realized by the clustering unit 12 in the example embodiments) for generating reflection point clusters by clustering extracted persistent scatterers based on their phase and position, distance calculation means 203 (realized by the distance calculation unit 14 in the example embodiments) for calculating a distance between each of the persistent scatterers included in the reflection point clusters and each structure included in the observation area, representative value calculation means 204 (realized by the average calculation unit 15 in the example embodiments) for calculating each representative value (for example, an average value) for the distance between each persistent scatterer and each structure, for each reflection point cluster, and corresponding structure determination means 205 (realized by the corresponding structure determination unit 16 in the example embodiments) for associating the structure corresponding to the smallest representative value with the persistent scatterer, for each reflection point cluster.

Figure 14:
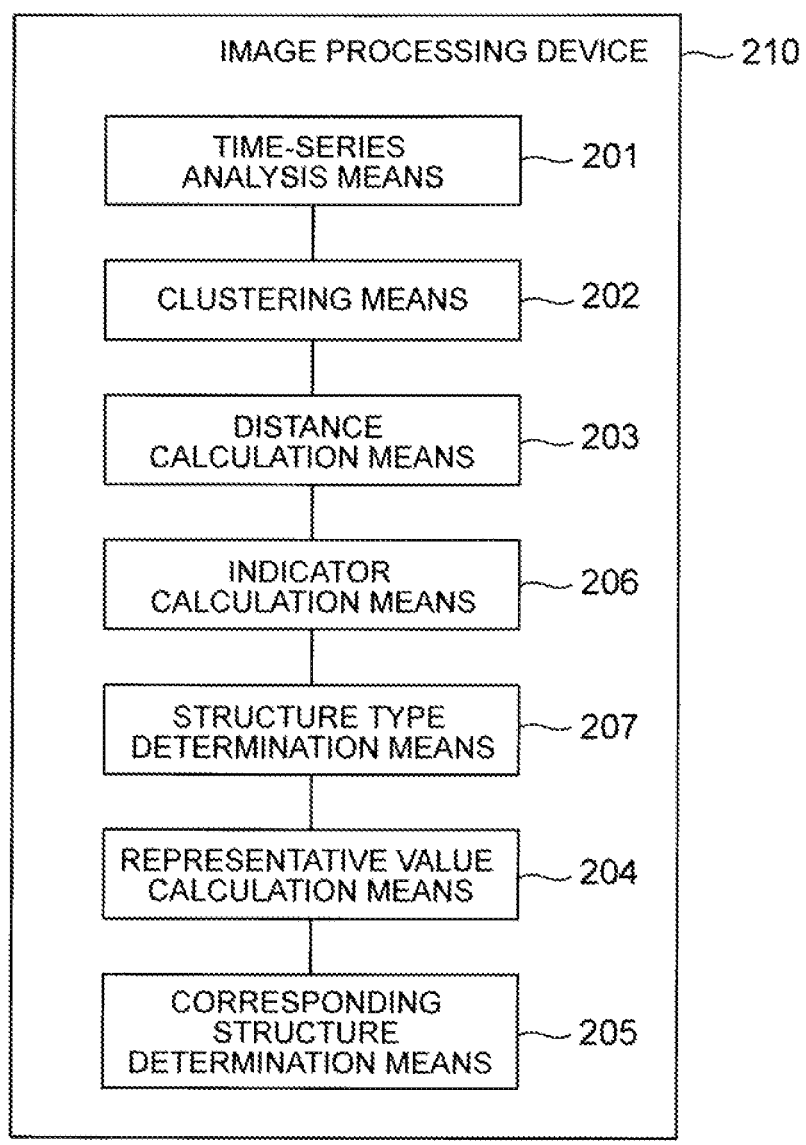
FIG. 14 It depicts a block diagram of a main part of a synthetic aperture radar image processing device of another type.

FIG. 14 is a block diagram of a main part of a synthetic aperture radar image processing device of another type. The image processing device 210 shown in FIG. 14 further comprises indicator calculation means 206 (realized by the variance calculation unit 27 in the example embodiments) for calculating an indicator value (for example, a variance value) of an indicator (for example, variance) representing variation of the distance between each persistent scatterer and each structure, and structure type determination means (realized by the structure type determination unit 28 in the example embodiments) for calculating degree of variation of the distance between each persistent scatterer and each structure using the indicator value and determining a type of structure based on a calculation result. The representative value calculation means 204 calculates the representative value of the distance between each persistent scatterer and each structure for the determined type of structure.

Figure 15:
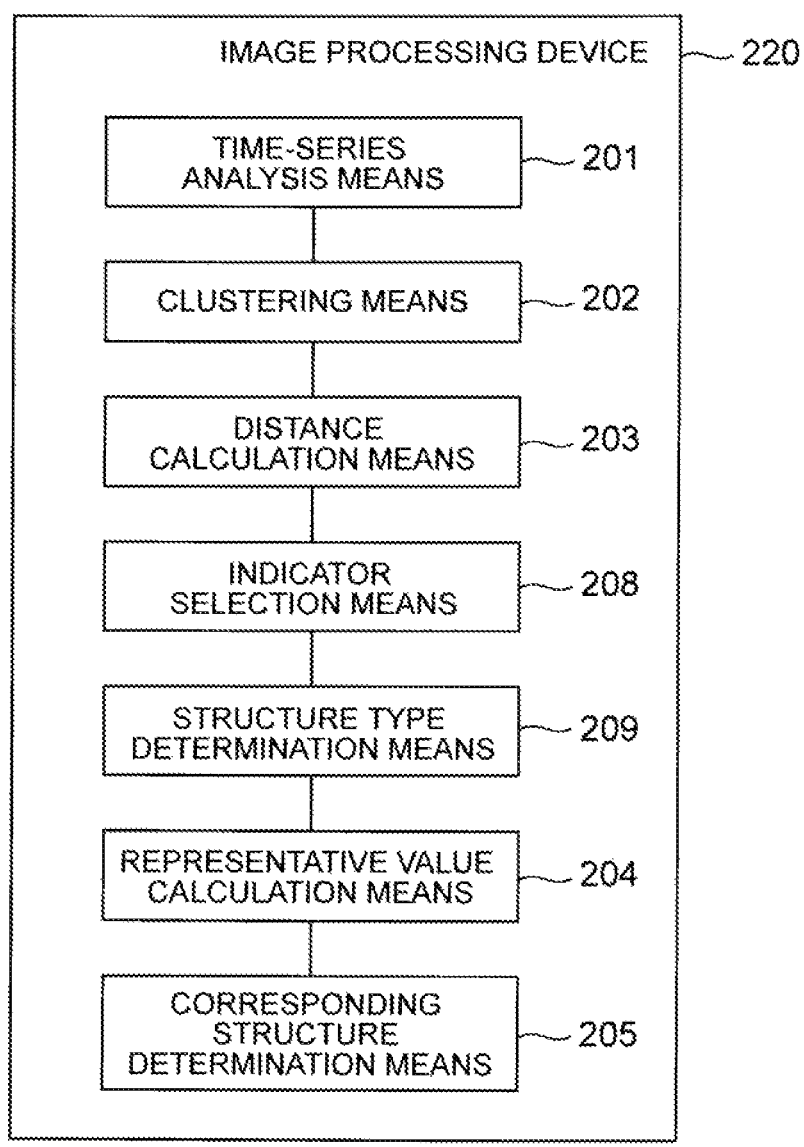
FIG. 15 It depicts a block diagram of a main part of a synthetic aperture radar image processing device of still another type.
Figure 16:
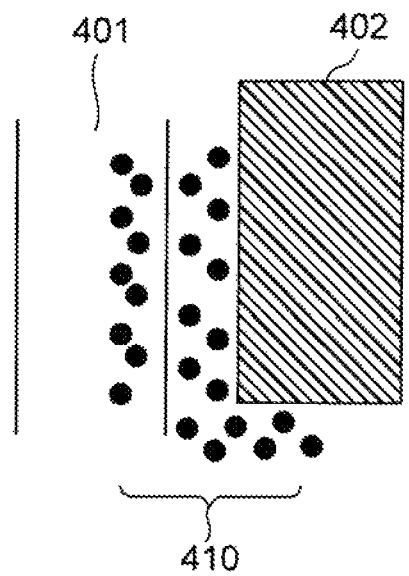
FIG. 16 It depicts an explanatory diagram schematically showing a state that reflection points are obtained in an area with a structure such as a road and a building.
Figure 17:
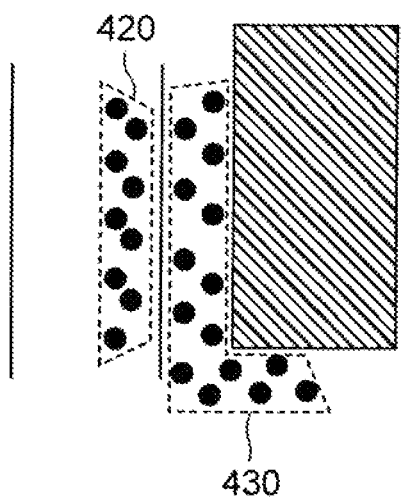
FIG. 17 It depicts an explanatory diagram schematically showing a state that reflection points are clustered.

FIG. 15 is a block diagram of a main part of a synthetic aperture radar image processing device of still another type. The image processing device 220 shown in FIG. 15 further comprises indicator selection means 208 (realized by the indicator calculation unit 30 and the indicator selection unit 31 in the example embodiments) for calculating an indicator value representing variation of the distance between each persistent scatterer and each structure for each of the plurality of indicators, and for selecting an indicator from the plurality of indicators based on a calculation result, and structure type determination means 209 (realized by the structure type determination unit 32 in the example embodiments) for determining a type of structure according to degree of variation indicated by the indicator value of the selected indicator. The representative value calculation means 204 calculates the representative value of the distance between each persistent scatterer and each structure for the determined type of structure.

A part of or all of the above example embodiments may also be described as, but not limited to, the following supplementary notes.

(Supplementary note 1) A synthetic aperture radar image processing device comprising:

time-series analysis means for extracting persistent scatterers from time-series observation data for the observation direction for an observation area observed from multiple observation directions by a radar, and calculating displacement speeds of the extracted persistent scatterers, clustering means for generating reflection point clusters by clustering extracted persistent scatterers based on their phase and position, distance calculation means for calculating a distance between each of the persistent scatterers included in the reflection point clusters and each structure included in the observation area, representative value calculation means for calculating each representative value for the distance between each persistent scatterer and each structure, for each reflection point cluster, and corresponding structure determination means for associating the structure corresponding to the smallest representative value with the persistent scatterer, for each reflection point cluster.

(Supplementary note 2) The synthetic aperture radar image processing device of Supplementary note 1, further comprising:

indicator calculation means for calculating an indicator value of an indicator representing variation of the distance between each persistent scatterer and each structure, and structure type determination means for calculating degree of variation of the distance between each persistent scatterer and each structure using the indicator value and determining a type of structure based on a calculation result, wherein the representative value calculation means calculates the representative value of the distance between each persistent scatterer and each structure for the determined type of structure.

(Supplementary note 3) The synthetic aperture radar image processing device of Supplementary note 1, further comprising:

indicator selection means for calculating an indicator value representing variation of the distance between each persistent scatterer and each structure for each of the plurality of indicators, and for selecting an indicator from the plurality of indicators based on a calculation result, and structure type determination means for determining a type of structure according to degree of variation indicated by the indicator value of the selected indicator, wherein the representative value calculation means calculates the representative value of the distance between each persistent scatterer and each structure for the determined type of structure.

(Supplementary note 4) The synthetic aperture radar image processing device of Supplementary note 2 or 3, wherein the structure type determination means performs clustering a set of minimum indicator values, associates the reflection point cluster belonging to a class with the smallest indicator value with a road structure, associates the reflection point cluster belonging to a class with the largest indicator value with a grassland or ground, and associates the reflection point cluster belonging to other classes with building structures.

(Supplementary note 5) The synthetic aperture radar image processing device of any one of Supplementary notes 1 to 4, wherein the representative value calculation means uses an average value as the representative value.

(Supplementary note 6) A synthetic aperture radar image processing method comprising:

extracting persistent scatterers from time-series observation data for the observation direction for an observation area observed from multiple observation directions by a radar, and calculating displacement speeds of the extracted persistent scatterers, generating reflection point clusters by clustering extracted persistent scatterers based on their phase and position, calculating the distances between each of the persistent scatterers included in the reflection point clusters and structures included in the observation area, calculating a distance between each of the persistent scatterers included in the reflection point clusters and each structure included in the observation area, calculating each representative value for the distance between each persistent scatterer and each structure, for each reflection point cluster, and associating the structure corresponding to the smallest representative value with the persistent scatterer, for each reflection point cluster.

(Supplementary note 7) The synthetic aperture radar image processing method of Supplementary note 6, further comprising:

calculating an indicator value of an indicator representing variation of the distance between each persistent scatterer and each structure, and calculating degree of variation of the distance between each persistent scatterer and each structure using the indicator value and determining a type of structure based on a calculation result, wherein when calculating the representative value, the representative value of the distance between each persistent scatterer and each structure for the determined type of structure is calculated.

(Supplementary note 8) The synthetic aperture radar image processing method of Supplementary note 6, further comprising:

calculating an indicator value representing variation of the distance between each persistent scatterer and each structure for each of the plurality of indicators and selecting an indicator from the plurality of indicators based on a calculation result, and determining a type of structure according to degree of variation indicated by the indicator value of the selected indicator, wherein when calculating the representative value, the representative value of the distance between each persistent scatterer and each structure for the determined type of structure is calculated.

(Supplementary note 9) A synthetic aperture radar image processing program causing a computer to execute:

a process of extracting persistent scatterers from time-series observation data for the observation direction for an observation area observed from multiple observation directions by a radar, and calculating displacement speeds of the extracted persistent scatterers, a process of generating reflection point clusters by clustering extracted persistent scatterers based on their phase and position, a process of calculating the distances between each of the persistent scatterers included in the reflection point clusters and structures included in the observation area, a process of calculating a distance between each of the persistent scatterers included in the reflection point clusters and each structure included in the observation area, a process of calculating each representative value for the distance between each persistent scatterer and each structure, for each reflection point cluster, and a process of associating the structure corresponding to the smallest representative value with the persistent scatterer, for each reflection point cluster.

(Supplementary note 10) The synthetic aperture radar image processing program of Supplementary note 9, causing the computer to execute:

a process of calculating an indicator value of an indicator representing variation of the distance between each persistent scatterer and each structure, and a process of calculating degree of variation of the distance between each persistent scatterer and each structure using the indicator value and determining a type of structure based on a calculation result, wherein when calculating the representative value, the representative value of the distance between each persistent scatterer and each structure for the determined type of structure is calculated.

(Supplementary note 11) The synthetic aperture radar image processing program of Supplementary note 9, causing the computer to execute:

a process of calculating an indicator value representing variation of the distance between each persistent scatterer and each structure for each of the plurality of indicators and selecting an indicator from the plurality of indicators based on a calculation result, and a process of determining a type of structure according to degree of variation indicated by the indicator value of the selected indicator, wherein when calculating the representative value, the representative value of the distance between each persistent scatterer and each structure for the determined type of structure is calculated.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST

11 Time-series analysis unit
12 Clustering unit
13 Structure information extraction unit
14 Distance calculation unit
15 Average calculation unit
16 Corresponding structure determination unit
27 Variance calculation unit
28 Structure type determination unit
29 Average calculation unit
30 Indicator calculation unit
31 Indicator selection unit
32 Structure type determination unit
100 CPU
101, 102 Storage device
103 Memory
200, 210, 220 Image processing device
201 Time-series analysis means
202 Clustering means
203 Distance calculation means
204 Representative value calculation means
205 Corresponding structure determination means
206 Indicator calculation means
207 Structure type determination means
208 Indicator selection means
209 Structure type determination means

What is claimed is:

1. A synthetic aperture radar image processing device comprising:

a time-series analysis unit which extracts persistent scatterers from time-series observation data for the observation direction for an observation area observed from multiple observation directions by a radar, and calculating displacement speeds of the extracted persistent scatterers, a clustering unit which generates reflection point clusters by clustering extracted persistent scatterers based on their phase and position, a distance calculation unit which calculates a distance between each of the persistent scatterers included in the reflection point clusters and each structure included in the observation area, a representative value calculation unit which calculates each representative value for the distance between each persistent scatterer and each structure, for each reflection point cluster, and a corresponding structure determination unit which associates the structure corresponding to the smallest representative value with the persistent scatterer, for each reflection point cluster.

2. The synthetic aperture radar image processing device according to claim 1, further comprising:

an indicator calculation unit which calculates an indicator value of an indicator representing variation of the distance between each persistent scatterer and each structure, and a structure type determination unit which determines a type of structure according to degree of variation indicated by the indicator value, wherein the representative value calculation unit calculates the representative value of the distance between each persistent scatterer and each structure for the determined type of structure.

3. The synthetic aperture radar image processing device according to claim 1, further comprising:

an indicator selection unit which calculates an indicator value representing variation of the distance between each persistent scatterer and each structure for each of the plurality of indicators, and for selecting an indicator from the plurality of indicators based on a calculation result, and a structure type determination unit which determines a type of structure according to degree of variation indicated by the indicator value of the selected indicator, wherein the representative value calculation unit calculates the representative value of the distance between each persistent scatterer and each structure for the determined type of structure.

4. The synthetic aperture radar image processing device according to claim 2 or 3, claim 2, wherein the structure type determination unit performs clustering a set of minimum indicator values, associates the reflection point cluster belonging to a class with the smallest indicator value with a road structure, associates the reflection point cluster belonging to a class with the largest indicator value with a grassland or ground, and associates the reflection point cluster belonging to other classes with building structures.

5. The synthetic aperture radar image processing device according to claim 1 wherein
the representative value calculation unit uses an average value as the representative value.

6. A synthetic aperture radar image processing method comprising:
extracting persistent scatterers from time-series observation data for the observation direction for an observation area observed from multiple observation directions by a radar, and calculating displacement speeds of the extracted persistent scatterers,
generating reflection point clusters by clustering extracted persistent scatterers based on their phase and position,
calculating the distances between each of the persistent scatterers included in the reflection point clusters and structures included in the observation area,
calculating a distance between each of the persistent scatterers included in the reflection point clusters and each structure included in the observation area,
calculating each representative value for the distance between each persistent scatterer and each structure, for each reflection point cluster, and
associating the structure corresponding to the smallest representative value with the persistent scatterer, for each reflection point cluster.

7. The synthetic aperture radar image processing method according to claim 6, further comprising:
calculating an indicator value of an indicator representing variation of the distance between each persistent scatterer and each structure, and
calculating degree of variation of the distance between each persistent scatterer and each structure using the indicator value and determining a type of structure based on a calculation result,
wherein when calculating the representative value, the representative value of the distance between each persistent scatterer and each structure for the determined type of structure is calculated.

8. The synthetic aperture radar image processing method according to claim 6, further comprising:
calculating an indicator value representing variation of the distance between each persistent scatterer and each structure for each of the plurality of indicators and selecting an indicator from the plurality of indicators based on a calculation result, and
determining a type of structure according to degree of variation indicated by the indicator value of the selected indicator,
wherein when calculating the representative value, the representative value of the distance between each persistent scatterer and each structure for the determined type of structure is calculated.

9. A non-transitory computer readable recording medium storing a synthetic aperture radar image processing program which, when executed by a processor, performs:
extracting persistent scatterers from time-series observation data for the observation direction for an observation area observed from multiple observation directions by a radar, and calculating displacement speeds of the extracted persistent scatterers,
generating reflection point clusters by clustering extracted persistent scatterers based on their phase and position,
calculating the distances between each of the persistent scatterers included in the reflection point clusters and structures included in the observation area,
calculating a distance between each of the persistent scatterers included in the reflection point clusters and each structure included in the observation area,
calculating each representative value for the distance between each persistent scatterer and each structure, for each reflection point cluster, and
associating the structure corresponding to the smallest representative value with the persistent scatterer, for each reflection point cluster.

10. The non-transitory computer readable recording medium storing the synthetic aperture radar image processing program according to claim 9, which, when executed by the processor, further performs:
calculating an indicator value of an indicator representing variation of the distance between each persistent scatterer and each structure, and
calculating degree of variation of the distance between each persistent scatterer and each structure using the indicator value and determining a type of structure based on a calculation result,
wherein when calculating the representative value, the representative value of the distance between each persistent scatterer and each structure for the determined type of structure is calculated.

11. The non-transitory computer readable recording medium storing the synthetic aperture radar image processing program according to claim 9, which, when executed by the processor, further performs:
calculating an indicator value representing variation of the distance between each persistent scatterer and each structure for each of the plurality of indicators and selecting an indicator from the plurality of indicators based on a calculation result, and
determining a type of structure according to degree of variation indicated by the indicator value of the selected indicator,
wherein when calculating the representative value, the representative value of the distance between each persistent scatterer and each structure for the determined type of structure is calculated.

12. The synthetic aperture radar image processing device according to claim 3, wherein
the structure type determination unit performs clustering a set of minimum indicator values, associates the reflection point cluster belonging to a class with the smallest indicator value with a road structure, associates the reflection point cluster belonging to a class with the largest indicator value with a grassland or ground, and associates the reflection point cluster belonging to other classes with building structures.

13. The synthetic aperture radar image processing device according to claim 2, wherein
the representative value calculation unit uses an average value as the representative value.

14. The synthetic aperture radar image processing device according to claim 3, wherein
the representative value calculation unit uses an average value as the representative value.

15. The synthetic aperture radar image processing device according to claim 4, wherein
the representative value calculation unit uses an average value as the representative value.

* * * * *